Nov. 5, 1968  C. J. KORZINEK  3,409,494
SEALING ELEMENT FOR SHRINK FILM PACKAGING MACHINE
Filed March 3, 1966

INVENTOR.

BY
*Ernest J. Peterson*

AGENT

3,409,494
SEALING ELEMENT FOR SHRINK FILM PACKAGING MACHINE

Charles J. Korzinek, Wilmington, Del., assignor to Hercules Incorporated, a corporation of Delaware
Filed Mar. 3, 1966, Ser. No. 531,561
3 Claims. (Cl. 156—515)

The present invention relates to a packaging machine for wrapping or enclosing an article in a thin sheet or film of thermoplastic material and, more particularly, to the film severing and sealing element for such a machine. Machines of this type are commonly used to apply to an article a bi-axially oriented or shrink-type film that is later subjected to heat to cause the same to shrink and thus conform tightly to the shape of the article.

The primary object of this invention is to provide a packaging machine which will produce improved seals at the severed edges of two plies of film from which the package is formed, that is, to provide more uniform seals of greater strength and fewer voids or unsealed sections or lengths along the edges than has heretofore been obtained. Further objects of this invention are to provide a machine of the above type in which seals of uniform high quality are produced at relatvely high production rates.

The above objects are attained by the use of a severing and sealing element in the form of a V-shaped ribbon of an electrical resistance heating material such as "Nichrome." The ribbon is disposed with the apex thereof toward the film to be cut and sealed so that, with the film clamped between the ribbon and the opposing member, the maximum compression of the film is at the apex and there is decreasing compression of the film laterally from the apex. When the ribbon is heated, the film is initially severed at the apex to define a sharp and uniform severing line and the severed edges are thereafter worked progressively back from the severing line as they are acted upon by the decreasing compression and the diverging side walls of the ribbon. Thus, with the film severed precisely along a predetermined line, there is provided an optimum and uniform amount of film in each bead at the severed edges and, at the same time, the diverging side walls of the ribbon melt the film back from the severed edge smoothly and uniformly. Also, because of the relatively low mass of the ribbon, it is adapted for faster cycling in systems of the thermal impulse type in which, with the film clamped, the sealing element is heated to a cutting and sealing temperature by a surge of electrical power and then cools to permit the seals to set before the clamp is released.

With the above and other objects in view, a presently preferred embodiment of the invention in hereinafter described with reference to the accompanying drawings, in which.

Figure 1:
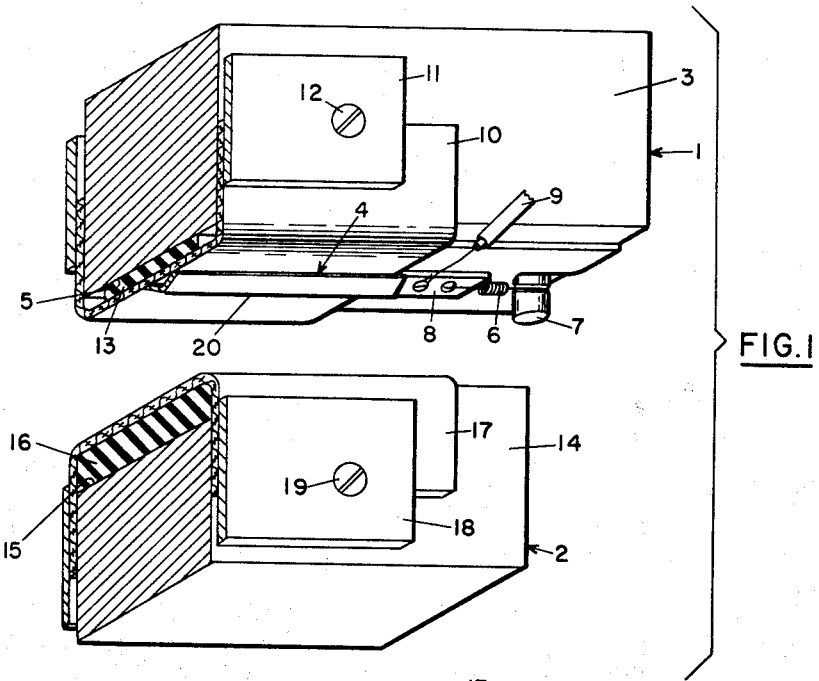
FIG. 1 is a fragmentary perspective view of the sealing elements of a shrink-film packaging machine embodying the present invention.

With reference to the drawings, there is illustrated a pair of opposed jaws including an upper or severing jaw 1 and a lower or opposing jaw 2 of a shrink-film packaging machine. The severing jaw 1 comprises a rigid base member in the form of a bar 3. A cutting and sealing element 4 is disposed along the longitudinal center line of the working face 5 of the bar 3 and is maintained under tension to hold it in position on the working face 5 despite the expansion and contraction thereof as it is heated to and cooled from cutting and sealing temperature. The illustrated means for tensioning the element 4 comprises a coil spring 6 that is anchored at one end by an electrically insulated post 7 and connected at its other end to an extension 8 that is mechanically and electrically connected as by silver soldering to the element 4. Electrical power is delivered to the element 4 by a lead 9 that is electrically and mechanically connected to the extension 8. To prevent the film from adhering to the bar 3, there is provided a tape 10 interposed between the cutting and sealing element 4 and the bar 3. The tape 10 is preferably formed of a Teflon-impregnated fiber glass and may be secured to the bar 3 by straps 11 fastened by screws 12 to the sides of the bar 3. To insure electrical insulation of the element 4 from the bar 3 for example, in the event that the tape 10 may be severed after repeated operations, there is interposed between the tape 10 and bar 3 a strip 13 of an insulating material capable of withstanding the heat of the cutting and sealing element, such as a phenol plastic.

The opposing jaw 2 consists of a base member in the form of a bar 14 having a working face 15 covered by a backing member 16 of a resilient material such as rubber. A tape 17 similar to the tape 10 covers the resilient backing member 16 and is secured in position by straps 18 fastened by screws 19 to the sides of the bar 14.

In the same manner as in the operation of a conventional impulse-type shrink-film packaging machine, the machine as above described is adapted to cut and to seal together the cut edges of two plies of a thermoplastic film F. The film is placed between the jaws 1 and 2 which are then closed, normally by moving the severing jaw 1 against the stationary backing jaw 2. The film is thus clamped between the two jaws and particularly between the tapes 10 and 17, with the cutting and sealing element 4 in contact with the film. The element 4 is then heated to a cutting and sealing temperature by a surge of electrical power supplied by the lead 9. After the film is cooled and set, the jaws 1 and 2 are opened to remove the work piece.

The novelty in accordance with this invention is in the severing and sealing element 4. As shown, the element 4 is formed of a strip of a resistance heating material, for example, a $\frac{1}{16}''$ x .0045" strip of "Nichrome V," which is bent along its longitudinal center line into a V-shape with an apex 20 and diverging legs 21 terminating in free ends 22. The element 4 is positioned with the ends 22 of the legs against the tape 10 and the apex 20 adapted to engage the two plies of the film F which are inserted between the element 4 and the tape 17 of the lower jaw 2. It has been found that by substituting the element 4 as herein contemplated for the conventional wire element of the prior art, a significant improvement in the operation of the machine is achieved. In particular, the appearance of the seals is improved and the number of faulty seals, that is, seals of inadequate strength or seals in which there were voids or unsealed lengths at the edges of the two plies of the film, were significantly reduced.

Figure 2:
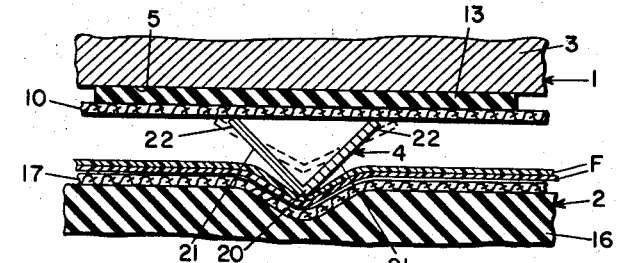
FIGS. 2, 3 and 4 are detail sectional views transversely of the sealing elements of FIG. 1, illustrating the parts in successive positions of operation.
Figure 3:
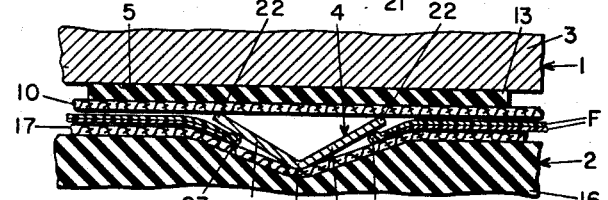

In an effort to understand the invention but without intending to limit the same to any theory of operation, it would appear that the improved results are achieved by the clamping and the positive control of the film in the area where the seals are formed. As the severing jaw 1 is moved toward the opposing jaw 2, the apex 20 of the element 4 initially engages the film F, as illustrated in FIG. 2 wherein the jaws are illustrated partially closed. As the severing jaw 1 continues to advance to its closed position, the apex 20 is forced into the backing member 16, thereby flattening the element 4, as indicated in FIG. 3 and also in phantom lines in FIG. 2. Flattening of the element 4 is facilitated by the use in the tape 10 of a material such as Teflon having a low frictional resistance which permits the ends 22 of the legs 21 to slide thereon. In this manner, the film F is compressed between the element 4 and the backing member 16 across the entire width of the element 4, the degree of compression varying from a sharp maximum at the apex 20 to a minimum at the edges 22. When the element 4 is heated by a surge of electrical power, the film F is initially melted and thereby severed at the apex 20 to produce a sharp severed line along the element 4 that is uniformly at the midpoint widthwise thereof. After severing, the edges of the films are melted progressively outwardly from the apex 20 to produce smoothly growing beads 23 of melted material along the severed edges. At the same time, the decreasing compression between the element 4 and the backing member 16, as well as the shrink characteristics of the film, tend to work the beads 23 outwardly from the apex 20. In addition, the compression between the element 4 and the backing member 16 presses the two plies of the film F together, so that, as they melt back, they will intermix and fuse to form a solid connection between the plies.

The low cross-sectional profile of the V-shaped element 4 as compared to a wire element affords another advantage in that the clamping of the film between the element 4 and the backing member 16 tends to inhibit shrinking of the film endwise of the cut edge, which would tend to cause puckering of the edge.

Figure 4:
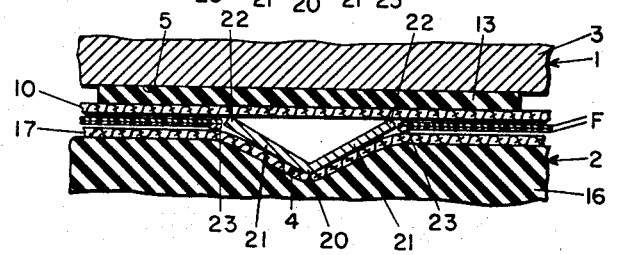

The ultimate position of the beads 23 are as illustrated in FIG. 4, that is, slightly withdrawn from the ends 22 of the element 4 and in the pocket of minimum pressure at the intersection of the ends 22 with the tape 10. This ultimate position of the beads 23 constitutes the sealing lines which, as a function of the configuration of the illustrated element 4, are in spaced parallel relation to each other and are substantially equidistant laterally from the apex 20 of the element 4. The distance between the sealing lines and the apex 20 constitutes the width of the film that was consumed in formation of the beads 23.

In addition to the smooth and uniform formation of the seal beads, a further result achieved by the use of the V-shaped sealing wire is that the quantity of film consumed in the bead is increased over that which would be consumed with a conventional wire severing and sealing element of comparable mass. Conversely, with a wire having a width comparable to the width of the V-shaped element 4, the mass of the wire would be many times greater than that of the element 4. Because of the reduced mass of the element 4, less power is required to raise it to the cutting and sealing temperature and also, since less heat is generated, there is less heat to dissipate in order to cool and set the seal. Thus, not only is the cycle time reduced but also, there will be less residual heat in the elements, which reduces the possibility that the jaws 1 and 2 may become hot enough to effect an undesired sealing of the film F at points back from the beads 23.

What I claim and desire to protect by Letters Patent is:

1. In a shrink-film packaging machine, means for severing and sealing the severed edges of a plurality of plies of thermoplastic film comprising a pair of opposed jaws for clamping the film between the working faces thereof and including a severing jaw and an opposing jaw, a resilient backing member on the working face of the opposing jaw and a severing and sealing element on the working face of the severing jaw for severing the film by heat and for heat sealing the severed edges, said severing and sealing element comprising a ribbon having a substantially V-shaped cross-section and disposed with the side edges thereof toward said severing jaw and the apex thereof toward the backing jaw whereby when said jaws are closed said element compresses the film against said backing member with the maximum pressure at said apex and progressively decreasing pressure toward said side edges, said jaws acting to clamp the film on both sides outwardly of said severing and sealing element, and means for heating said element to a severing and sealing temperature.

2. In a shrink-film packaging machine in accordance with claim 1 in which said severing and heating element is heated to severing and sealing temperature by a surge of electrical power.

3. In a shrink-film packaging machine in accordance with claim 1 in which the working face of the severing jaw and the backing member on the working face of the opposing jaw are covered by a material having a heat resistance that is high relative to the temperature of the severing and sealing element and having a low coefficient of friction and a low adherability relative to the molten film.

No references cited.

DOUGLAS J. DRUMMOND, *Primary Examiner.*